(12) United States Patent
Cheng et al.

(10) Patent No.: US 10,503,300 B2
(45) Date of Patent: Dec. 10, 2019

(54) PRESSURE-SENSING CIRCUIT, METHOD FOR DRIVING PRESSURE-SENSING CIRCUIT, AND DISPLAY DEVICE

(71) Applicant: BOE TECHNOLOGY GROUP CO., LTD., Beijing (CN)

(72) Inventors: Chihjen Cheng, Beijing (CN); Haisheng Wang, Beijing (CN); Xiaoliang Ding, Beijing (CN); Yingming Liu, Beijing (CN); Yuzhen Guo, Beijing (CN); Pengpeng Wang, Beijing (CN); Xueyou Cao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/957,294

(22) Filed: Apr. 19, 2018

(65) Prior Publication Data
US 2019/0064976 A1    Feb. 28, 2019

(30) Foreign Application Priority Data
Aug. 31, 2017    (CN) .......................... 2017 1 0770429

(51) Int. Cl.
G06F 3/041    (2006.01)
G06F 3/045    (2006.01)
G01L 9/00    (2006.01)

(52) U.S. Cl.
CPC .......... *G06F 3/0412* (2013.01); *G01L 9/0052* (2013.01); *G06F 3/045* (2013.01); *G06F 3/0414* (2013.01)

(58) Field of Classification Search
CPC ........ G06F 3/041; G06F 3/045; G06F 3/0412; G06F 3/0414
See application file for complete search history.

(56) References Cited

U.S. PATENT DOCUMENTS

2012/0162122 A1* 6/2012 Geaghan ............... G06F 3/0414
                                                    345/174
2018/0061999 A1* 3/2018 Hiraki ..................... G01L 1/205

* cited by examiner

*Primary Examiner* — Md Saiful A Siddiqui
(74) *Attorney, Agent, or Firm* — Brooks Kushman P.C.

(57) ABSTRACT

A pressure-sensing circuit, a method for driving the pressure-sensing circuit and a display device are provided. The pressure-sensing circuit includes pressure-sensing gating lines arranged in rows, pressure-sensing reading lines arranged in columns, piezoresistance sensing circuits arranged in N rows and M columns, a pressure-sensing sub-circuit, a current input control circuit, and a current supply circuit for supplying a pressure-sensing current, where each of N and M is an integer greater than 1. The current input control circuit includes N current input control sub-circuits. The pressure-sensing sub-circuit is connected to each of the pressure-sensing reading lines and configured to perform a pressure-sensing operation in accordance with a voltage signal acquired from each of the pressure-sensing reading lines.

18 Claims, 2 Drawing Sheets

PRESSURE-SENSING CIRCUIT, METHOD FOR DRIVING PRESSURE-SENSING CIRCUIT, AND DISPLAY DEVICE

CROSS-REFERENCE TO RELATED APPLICATION

This application claims priority to Chinese Patent Application No. 201710770429.2 filed on Aug. 31, 2017, which is incorporated herein by reference in its entirety.

TECHNICAL FIELD

The present disclosure relates to the field of pressure-sensing technology, in particular to a pressure-sensing circuit, a driving method thereof and a display device.

BACKGROUND

In related art, a piezoresistance array sensor of a pressure-sensing circuit includes a pressure-sensing sub-circuit and a plurality of piezoresistance sensing circuits arranged in an array form. Each piezoresistance sensing circuit includes a piezoresistance sensor, a switching transistor and a resistance voltage amplifier. In the case that a resistance of the piezoresistance sensor is Rx, a wire is connected in series with the piezoresistance sensor, and a resistance of the wire is related to a length thereof. Hence, for a voltage signal generated by each piezoresistance sensor, its value detected at a proximal or remote end (near to or far away from the pressure-sensing sub-circuit) may be affected by the resistance of the wire, and an output voltage of the piezoresistance array sensor may be related to the resistance of the wire and an on-state resistance of the switching transistor, thereby an inaccurate pressure-sensing result may occur.

SUMMARY

A main object of the present disclosure is to provide a pressure-sensing circuit, a driving method thereof and a display device.

In one aspect, the present disclosure provides in some embodiments a pressure-sensing circuit, including pressure-sensing gating lines arranged in rows, pressure-sensing reading lines arranged in columns, piezoresistance sensing circuits arranged in N rows and M columns, a pressure-sensing sub-circuit, a current input control circuit, and a current supply circuit for supplying a pressure-sensing current, where each of N and M is an integer greater than 1. A piezoresistance sensing circuit in an $n^{th}$ row and an $m^{th}$ column includes a piezoresistance sensor in the $n^{th}$ row and the $m^{th}$ column and a switching circuit in the $n^{th}$ row and the $m^{th}$ column, where n is a positive integer smaller than or equal to N, and m+1 is a positive integer smaller than or equal to M. A first end of the piezoresistance sensor in the $n^{th}$ row and the $m^{th}$ column is connected to a pressure-sensing reading line in the $m^{th}$ column, a control end of the switching circuit in the $n^{th}$ row and the $m^{th}$ column is connected to a pressure-sensing gating line in the $n^{th}$ row, a first end of the switching circuit in the $n^{th}$ row and the $m^{th}$ column is connected to a second end of the piezoresistance sensor in the $n^{th}$ row and the $m^{th}$ column, and a second end of the switching circuit in the $n^{th}$ row and the $m^{th}$ column is connected to a pressure-sensing reading line in the $(m+1)^{th}$ column. The piezoresistance sensing circuit in the $n^{th}$ row and an $M^{th}$ column includes a piezoresistance sensor in the $n^{th}$ row and the $M^{th}$ column and a switching circuit in the $n^{th}$ row and the $M^{th}$ column. A first end of the piezoresistance sensor in the $n^{th}$ row and the $M^{th}$ column is connected to a pressure-sensing reading line in the $M^{th}$ column, a control end of the switching circuit in the $n^{th}$ row and the $M^{th}$ column is connected to the pressure-sensing gating line in the $n^{th}$ row, a first end of the switching circuit in the $n^{th}$ row and the $M^{th}$ column is connected to a second end of the piezoresistance sensor in the $n^{th}$ row and the $M^{th}$ column, and a second end of the switching circuit in the $n^{th}$ row and the $M^{th}$ column is connected to a first level end. The current input control circuit includes N current input control sub-circuits. A first end of an $n^{th}$ current input control sub-circuit is connected to the current supply circuit, a first end of a piezoresistance sensor in the $n^{th}$ row and a first column is further connected to a second end of the $n^{th}$ current input control sub-circuit, and a control end of the $n^{th}$ current input control sub-circuit is connected to the pressure-sensing gating line in the $n^{th}$ row. The pressure-sensing sub-circuit is connected to the pressure-sensing reading lines and configured to perform a pressure-sensing operation in accordance with a voltage signal acquired from each pressure-sensing reading line.

In a possible embodiment of the present disclosure, the switching circuit in the $n^{th}$ row and the $m^{th}$ column includes a switching transistor in the $n^{th}$ row and the $m^{th}$ column, a gate electrode of which is connected to the pressure-sensing gating line in the $n^{th}$ row, a first electrode of which is connected to the second end of the piezoresistance sensor in the $n^{th}$ row and the $m^{th}$ column, and a second electrode of which is connected to the pressure-sensing reading line in the $(m+1)^{th}$ column. The switching circuit in the $n^{th}$ row and the $M^{th}$ column includes a switching transistor in the $n^{th}$ row and the $M^{th}$ column, a gate electrode of which is connected to the pressure-sensing gating line in the $n^{th}$ row, a first electrode of which is connected to the second end of the piezoresistance sensor in the $n^{th}$ row and the $M^{th}$ column, and a second electrode of which is connected to the first level end.

In a possible embodiment of the present disclosure, the $n^{th}$ current input control sub-circuit includes an $n^{th}$ current input control transistor, a gate electrode of which is connected to the pressure-sensing gating line in the $n^{th}$ row, a first electrode of which is connected to the current supply circuit, and a second electrode of which is connected to the first end of the piezoresistance sensor in the $n^{th}$ row and the first column.

In a possible embodiment of the present disclosure, the $n^{th}$ current input control transistor, the switching transistor in the $n^{th}$ row and the $m^{th}$ column and the switching transistor in the $n^{th}$ row and the $M^{th}$ column are n-type transistors, or the $n^{th}$ current input control transistor, the switching transistor in the $n^{th}$ row and the $m^{th}$ column and the switching transistor in the $n^{th}$ row and the $M^{th}$ column are p-type transistors.

In a possible embodiment of the present disclosure, the current supply circuit includes a current source.

In a possible embodiment of the present disclosure, the pressure-sensing circuit further includes a voltage amplification circuit, and the pressure-sensing sub-circuit is connected to the pressure-sensing reading lines via the voltage amplification circuit. The voltage amplification circuit includes a plurality of voltage amplifiers. An input end of each voltage amplifier is connected to one of the pressure-sensing reading line, and an output end thereof is connected to the pressure-sensing sub-circuit. Each voltage amplifier is configured to amplify the voltage signal acquired from the pressure-sensing reading line, and transmit the amplified voltage signal to the pressure-sensing sub-circuit. The pressure-sensing sub-circuit is further configured to perform the pressure-sensing operation in accordance with the amplified voltage signal.

In a possible embodiment of the present disclosure, the first level end is the ground.

In another aspect, the present disclosure provides in some embodiments a method for driving the above-mentioned pressure-sensing circuit, including steps of: providing, by a current supply circuit, a pressure-sensing current; applying a current to pressure-sensing gating lines in N rows in a time-division manner; in the case that the current has been applied to a pressure-sensing gating line in the $n^{th}$ row, controlling, by a switching circuit in an $n^{th}$ row and an $m^{th}$ column, a second end of a piezoresistance sensor in the $n^{th}$ row and the $m^{th}$ column to be electrically connected to a pressure-sensing reading line in the $(m+1)^{th}$ column, and controlling, by a switching circuit in the $n^{th}$ row and an $M^{th}$ column, a second end of a piezoresistance sensor in the $n^{th}$ row and the $M^{th}$ column to be electrically connected to a first level end so as to enable the piezoresistance sensors in the $n^{th}$ row to be connected in series with each other, and controlling, by an $n^{th}$ input control circuit, the current supply circuit to be electrically connected to a first end of a piezoresistance sensor in the $n^{th}$ row and a first column so as to enable the pressure-sensing current from the current supply circuit to flow to the first end of the piezoresistance sensor in the $n^{th}$ row and the first column, thereby to enable the pressure-sensing current to flow to the first level end through the piezoresistance sensors in the $n^{th}$ row connected in series with each other, where each of N and M is an integer greater than 1, n is a positive integer smaller than or equal to N, and m+1 is a positive integer smaller than or equal to M; and acquiring, by a pressure-sensing sub-circuit, a voltage signal from each pressure-sensing reading line, and performing a pressure-sensing operation in accordance with the voltage signal.

In a possible embodiment of the present disclosure, the pressure-sensing circuit includes a voltage amplification circuit, the pressure-sensing sub-circuit is connected to the pressure-sensing reading lines via the voltage amplification circuit. The voltage amplification circuit includes a plurality of voltage amplifiers. An input end of each of the voltage amplifiers is connected to a respective one of the pressure-sensing reading lines, and an output end thereof is connected to the pressure-sensing sub-circuit. The step of acquiring, by the pressure-sensing sub-circuit, the voltage signal from each pressure-sensing reading line and performing the pressure-sensing operation in accordance with the voltage signal includes: acquiring, by each voltage amplifier, the voltage signal from the pressure-sensing reading line connected to the voltage amplifier, amplifying, by each voltage amplifier, the voltage signal, and transmitting, by each voltage amplifier, the amplified voltage signal to the pressure-sensing sub-circuit; and performing, by the pressure-sensing sub-circuit, the pressure-sensing operation in accordance with the amplified voltage signal.

In yet another aspect, the present disclosure provides in some embodiments a display device including at least one of the above-mentioned pressure-sensing circuits.

In a possible embodiment of the present disclosure, the display device further includes a display panel and a driving Integrated Circuit (IC). Pressure-sensing gating lines, pressure-sensing reading lines, piezoresistance sensing circuits arranged in N rows and M columns and a current input control circuit of the pressure-sensing circuit are arranged on the display panel, where each of N and M is an integer greater than 1. A pressure-sensing sub-circuit and a current supply circuit for supplying a pressure-sensing current of the pressure-sensing circuit are arranged on the driving IC.

In a possible embodiment of the present disclosure, the pressure-sensing circuit includes a voltage amplification circuit which is arranged on the driving IC.

In a possible embodiment of the present disclosure, the display device includes at least two pressure-sensing circuits, and each of the pressure-sensing circuits comprises identical N pressure-sensing gating lines.

In a possible embodiment of the present disclosure, the pressure-sensing gating line is a gate line.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

Figure 1:
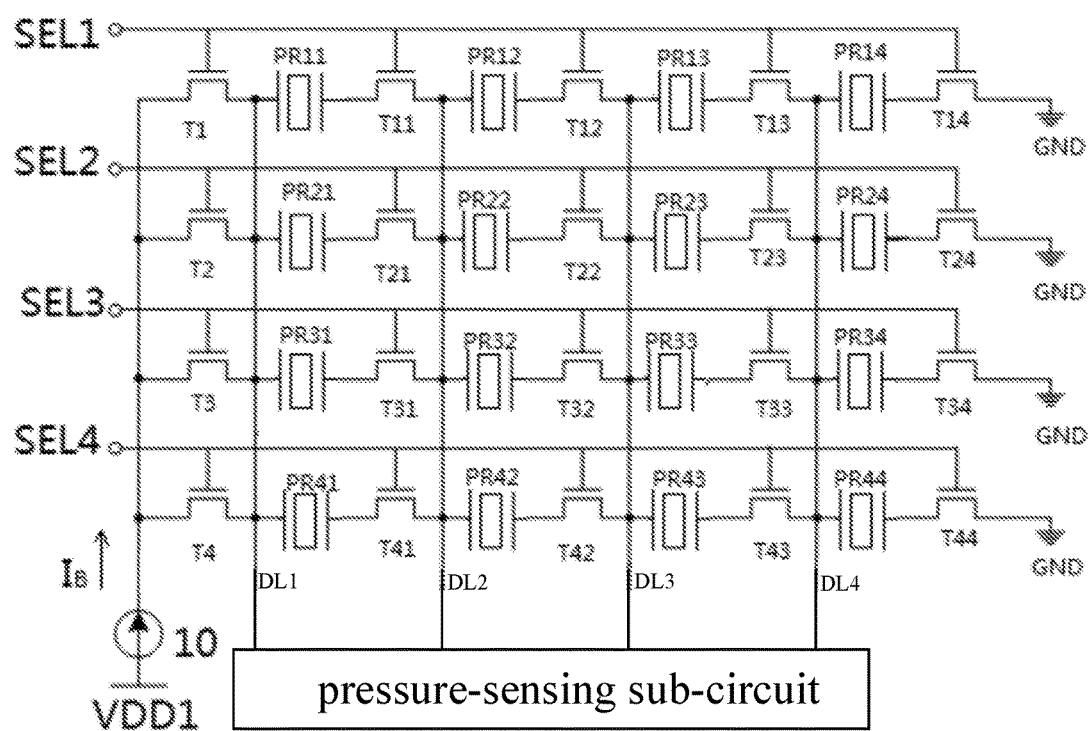
FIG. 1 is a schematic view showing a pressure-sensing circuit according to one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

All transistors used in the embodiments of the present disclosure may be thin film transistors (TFTs), field effect transistors (FETs) or any other elements each having an identical characteristic. In the embodiments of the present disclosure, in order to differentiate two electrodes of a transistor other than a gate electrode of the transistor from each other, one of them is called as first electrode and the other is called as second electrode. In actual use, the first electrode may be a drain electrode while the second electrode may be a source electrode, or the first electrode may be a source electrode while the second electrode may be a drain electrode.

The present disclosure provides in some embodiments a pressure-sensing circuit, including pressure-sensing gating lines arranged in rows, pressure-sensing reading lines arranged in columns, piezoresistance sensing circuits arranged in N rows and M columns, a pressure-sensing sub-circuit, a current input control circuit, and a current supply circuit for supplying a pressure-sensing current, where each of N and M is an integer greater than 1. A piezoresistance sensing circuit in an $n^{th}$ row and an $m^{th}$ column includes a piezoresistance sensor in the $n^{th}$ row and the $m^{th}$ column and a switching circuit in the $n^{th}$ row and the $m^{th}$ column, where n is a positive integer smaller than or equal to N, and m+1 is a positive integer smaller than or equal to M. A first end of the piezoresistance sensor in the $n^{th}$ row and the $m^{th}$ column is connected to a pressure-sensing reading line in the $m^{th}$ column, a control end of the switching circuit in the $n^{th}$ row and the $m^{th}$ column is connected to a pressure-sensing gating line in the $n^{th}$ row, a first end of the switching circuit in the $n^{th}$ row and the $m^{th}$ column is connected to a second end of the piezoresistance sensor in the $n^{th}$ row and the $m^{th}$ column, and a second end of the switching circuit in the $n^{th}$ row and the $m^{th}$ column is connected to a pressure-sensing reading line in the $(m+1)^{th}$ column. The piezoresistance sensing circuit in the $n^{th}$ row and an $M^{th}$ column includes a piezoresistance sensor in the $n^{th}$ row and the $M^{th}$ column and a switching circuit in the $n^{th}$ row and the $M^{th}$ column. A first end of the piezoresistance sensor in the $n^{th}$ row and the $M^{th}$ column is connected to a pressure-sensing reading line in the $M^{th}$ column, a control end of the switching circuit in the $n^{th}$ row and the $M^{th}$ column is connected to the pressure-sensing gating line in the $n^{th}$ row, a first end of the switching circuit in the $n^{th}$ row and the $M^{th}$ column is connected to a second end of the piezoresistance sensor in the $n^{th}$ row and the $M^{th}$ column, and a second end of the switching circuit in the $n^{th}$ row and the $M^{th}$ column is connected to a first level end. The current input control circuit includes N current input control sub-circuits. A first end of an $n^{th}$ current input control sub-circuit is connected to the current supply circuit, a first end of a piezoresistance sensor in the $n^{th}$ row and a first column is further connected to a second end of the $n^{th}$ current input control sub-circuit, and a control end of the $n^{th}$ current input control sub-circuit is connected to the pressure-sensing gating line in the $n^{th}$ row. The pressure-sensing sub-circuit is connected to the pressure-sensing reading lines and configured to perform a pressure-sensing operation in accordance with a voltage signal acquired from each pressure-sensing reading line.

According to the pressure-sensing circuit in the embodiments of the present disclosure, through the cooperation of a piezoresistance array and a detection circuit, it is able to perform the pressure-sensing operation in accordance with the voltage signal acquired from the pressure-sensing reading line. The pressure-sensing sub-circuit may acquire a voltage value of the voltage signal generated by a piezoresistance sensor in the $n^{th}$ row and an $(m-1)^{th}$ column in accordance with a difference between a voltage value of a voltage signal acquired from the pressure-sensing reading line in the $n^{th}$ row and the $m^{th}$ column and a voltage value of a voltage signal acquired from the pressure-sensing reading line in the $n^{th}$ row and the $(m-t)^{th}$ column, so as to determine a resistance of the piezoresistance sensor in the $n^{th}$ row and the $(m-1)^{th}$ column, thereby to determine whether or not a pressure has been applied to the piezoresistance sensor in the $n^{th}$ row and the $(m-1)^{th}$ column in accordance with the resistance. The pressure-sensing operation is performed in accordance with the voltage difference, so it is able to prevent a pressure-sensing result from being adversely affected by an on-state resistance of the switching transistor of the switching circuit, and reduce adverse impact of resistance of a wire, and prevent the voltage value of the voltage signal that is generated by each of the piezoresistance sensors and acquired at a proximal or remote end (near to or far away from the pressure-sensing sub-circuit) from being adversely affected by the resistance of the wire to some extent, thereby to improve the pressure-sensing accuracy.

To be specific, the switching circuit in the $n^{th}$ row and the $m^{th}$ column may include a switching transistor in the $n^{th}$ row and the $m^{th}$ column, a gate electrode of which is connected to the pressure-sensing gating line in the $n^{th}$ row, a first electrode of which is connected to the second end of the piezoresistance sensor in the $n^{th}$ row and the $m^{th}$ column, and a second electrode of which is connected to the pressure-sensing reading line in the $(m+1)^{th}$ column. The switching circuit in the $n^{th}$ row and the $M^{th}$ column may include a switching transistor in the $n^{th}$ row and the $M^{th}$ column, a gate electrode of which is connected to the pressure-sensing gating line in the $n^{th}$ row, a first electrode of which is connected to the second end of the piezoresistance sensor in the $n^{th}$ row and the $M^{th}$ column, and a second electrode of which is connected to the first level end.

To be specific, the $n^{th}$ current input control sub-circuit may include an $n^{th}$ current input control transistor, a gate electrode of which is connected to the pressure-sensing gating line in the $n^{th}$ row, a first electrode of which is connected to the current supply circuit, and a second electrode of which is connected to the first end of the piezoresistance sensor in the $n^{th}$ row and the first column.

In actual use, the $n^{th}$ current input control transistor, the switching transistor in the $n^{th}$ row and the $m^{th}$ column and the switching transistor in the $n^{th}$ row and the $M^{th}$ column may be n-type transistors, or the $n^{th}$ current input control transistor, the switching transistor in the $n^{th}$ row and the $m^{th}$ column and the switching transistor in the $n^{th}$ row and the $M^{th}$ column may be p-type transistors.

In actual use, the current supply circuit may include a current source.

In a possible embodiment of the present disclosure, the pressure-sensing circuit further includes a voltage amplification circuit, and the pressure-sensing sub-circuit is connected to the pressure-sensing reading lines via the voltage amplification circuit. The voltage amplification circuit includes a plurality of voltage amplifiers. An input end of each of the voltage amplifiers is connected to a respective one of the pressure-sensing reading line, and an output end of the voltage amplifier is connected to the pressure-sensing sub-circuit. Each voltage amplifier is configured to amplify the voltage signal acquired from the pressure-sensing reading line, and transmit the amplified voltage signal to the pressure-sensing sub-circuit. The pressure-sensing sub-circuit is further configured to perform the pressure-sensing operation in accordance with the amplified voltage signal.

In the embodiments of the present disclosure, the pressure-sensing circuit may further include the voltage amplification circuit, and the pressure-sensing sub-circuit may perform the pressure-sensing operation in accordance with the amplified voltage signal.

To be specific, the first level end may be the ground.

The pressure-sensing circuit will be described hereinafter in more details in conjunction with the embodiments.

As shown in FIG. 1, in one embodiment, the pressure-sensing circuit may include the pressure-sensing gating lines arranged in four rows, the pressure-sensing reading lines arranged in four columns, the piezoresistance sensing circuits arranged in four rows and four columns, the pressure-sensing sub-circuit, the current input control circuit and a first current source 10 for supplying a pressure-sensing current $I_B$.

In FIG. 1, the reference sign VDD1 represents a high level signal input end, the reference sign SEL1 represents a pressure-sensing gating line in the first row, the reference sign SEL2 represents a pressure-sensing gating line in the second row, the reference sign SEL3 represents a pressure-sensing gating line in the third row, the reference sign SEL4 represents a pressure-sensing gating line in the fourth row, the reference sign DL1 represents a pressure-sensing reading line in the first column, DL2 represents a pressure-sensing reading line in the second column, the reference sign DL3 represents a pressure-sensing reading line in the third column, and the reference sign DL4 represents a pressure-sensing reading line in the fourth column.

The current input control circuit includes a first current input control transistor T1, a second current input control transistor T2, a third current input control transistor T3 and a fourth current input control transistor T4.

A gate electrode of T1 is connected to the pressure-sensing gating line in the first row SEL1, a gate electrode of T2 is connected to the pressure-sensing gating line in the second row SEL2, a gate electrode of T3 is connected to the pressure-sensing gating line in the third row SEL3, and a gate electrode of T4 is connected to the pressure-sensing gating line in the fourth row SEL4.

Each of drain electrodes of T1, T2, T3 and T4 is connected to the first current source 10.

A piezoresistance sensing circuit in a first row and a first column includes a piezoresistance sensor PR11 in the first row and the first column and a switching transistor T11 in the first row and the first column. A first end of PR11 is connected to a source electrode of T1, a gate electrode of T11 is connected to the pressure-sensing gating line in the first row SEL1, a drain electrode of T11 is connected to a second end of PR11, and the first end of PR11 is further connected to the pressure-sensing reading line in the first column DL1.

A piezoresistance sensing circuit in the first row and a second column includes a piezoresistance sensor PR12 in the first row and the second column and a switching transistor T12 in the first row and the second column. A first end of PR12 is connected to a source electrode of T11, a gate electrode of T12 is connected to the pressure-sensing gating line in the first row SEL1, a drain electrode of T12 is connected to a second end of PR12, and the first end of PR12 is further connected to the pressure-sensing reading line in the second column DL2.

A piezoresistance sensing circuit in the first row and a third column includes a piezoresistance sensor PR13 in the first row and the third column and a switching transistor T13 in the first row and the third column. A first end of PR13 is connected to a source electrode of T12, a gate electrode of T13 is connected to the pressure-sensing gating line in the first row SEL1, a drain electrode of T13 is connected to a second end of PR13, and the first end of PR13 is further connected to the pressure-sensing reading line in the third column DL3.

A piezoresistance sensing circuit in the first row and a fourth column includes a piezoresistance sensor PR14 in the first row and the fourth column and a switching transistor T14 in the first row and the fourth column. A first end of PR14 is connected to a source electrode of T13, a gate electrode of T14 is connected to the pressure-sensing gating line in the first row SEL1, a drain electrode of T14 is connected to a second end of PR14, the first end of PR14 is further connected to the pressure-sensing reading line in the fourth column DL4, and a source electrode of T14 is connected to the ground GND.

A piezoresistance sensing circuit in a second row and the first column includes a piezoresistance sensor PR21 in the second row and the first column and a switching transistor T21 in the second row and the first column. A first end of PR21 is connected to the source electrode of T2, a gate electrode of T21 is connected to the pressure-sensing gating line in the second row SEL2, a drain electrode of T21 is connected to a second end of PR21, and the first end of PR21 is further connected to the pressure-sensing reading line in the first column DL1.

A piezoresistance sensing circuit in the second row and the second column includes a piezoresistance sensor PR22 in the second row and the second column and a switching transistor T22 in the second row and the second column. A first end of PR22 is connected to a source electrode of T21, a gate electrode of T22 is connected to the pressure-sensing gating line in the second row SEL2, a drain electrode of T22 is connected to a second end of PR22, and the first end of PR22 is further connected to the pressure-sensing reading line in the second column DL2.

A piezoresistance sensing circuit in the second row and the third column includes a piezoresistance sensor PR23 in the second row and the third column and a switching transistor T22 in the second row and the third column. A first end of PR23 is connected to a source electrode of T22, a gate electrode of T23 is connected to the pressure-sensing gating line in the second row SEL2, a drain electrode of T23 is connected to a second end of PR23, and the first end of PR23 is further connected to the pressure-sensing reading line in the third column DL3.

A piezoresistance sensing circuit in the second row and the fourth column includes a piezoresistance sensor PR24 in the second row and the fourth column and a switching transistor T24 in the second row and the fourth column. A first end of PR24 is connected to a source electrode of T23, a gate electrode of T24 is connected to the pressure-sensing gating line in the second row SEL2, a drain electrode of T24 is connected to a second end of PR24, the first end of PR24 is further connected to the pressure-sensing reading line in the fourth column DL4, and a source electrode T24 is connected to the ground GND.

A piezoresistance sensing circuit in a third row and the first column includes a piezoresistance sensor PR31 in the third row and the first column and a switching transistor T31 in the third row and the first column. A first end of PR31 is connected to the source electrode of T3, a gate electrode of T31 is connected to the pressure-sensing gating line in the third row SEL3, a drain electrode of T31 is connected to a second end of PR31, and the first end of PR31 is further connected to the pressure-sensing reading line in the first column DL1.

A piezoresistance sensing circuit in the third row and the second column includes a piezoresistance sensor PR32 in the third row and the second column and a switching transistor T32 in the third row and the second column. A first end of PR32 is connected to a source electrode of T31, a gate electrode of T32 is connected to the pressure-sensing gating line in the third row SEL3, a drain electrode of T32 is connected to a second end of PR32, and the first end of PR32 is further connected to the pressure-sensing reading line in the second column DL2.

A piezoresistance sensing circuit in the third row and the third column includes a piezoresistance sensor PR33 in the third row and the third column and a switching transistor T33 in the third row and the third column. A first end of PR33 is connected to a source electrode of T32, a gate electrode of T33 is connected to the pressure-sensing gating line in the third row SEL3, a drain electrode of T33 is connected to a second end of PR33, and the first end of PR33 is further connected to the pressure-sensing reading line in the third column DL3.

A piezoresistance sensing circuit in the third row and the fourth column includes a piezoresistance sensor PR34 in the third row and the fourth column and a switching transistor T34 in the third row and the fourth column. A first end of PR34 is connected to a source electrode of T33, a gate electrode of T34 is connected to the pressure-sensing gating line in the third row SEL3, a drain electrode of T34 is connected to a second end of PR34, the first end of PR34 is further connected to the pressure-sensing reading line in the fourth column DL4, and a source electrode of T34 is connected to the ground GND.

A piezoresistance sensing circuit in a fourth row and the first column includes a piezoresistance sensor PR41 in the fourth row and the first column and a switching transistor T41 in the fourth row and the first column. A first end of PR41 is connected to the source electrode of T4, a gate electrode of T41 is connected to the pressure-sensing gating line in the fourth row SEL4, a drain electrode of T41 is connected to a second end of PR41, and the first end of PR41 is further connected to the pressure-sensing reading line in the first column DL1.

A piezoresistance sensing circuit in the fourth row and the second column includes a piezoresistance sensor PR42 in the fourth row and the second column and a switching transistor T42 in the fourth row and the second column. A first end of PR42 is connected to a source electrode of T41, a gate electrode of T42 is connected to the pressure-sensing gating line in the fourth row SEL4, a drain electrode of T42 is connected to a second end of PR42, and the first end of PR42 is further connected to the pressure-sensing reading line in the second column DL2.

A piezoresistance sensing circuit in the fourth row and the third column includes a piezoresistance sensor PR43 in the fourth row and the third column and a switching transistor T43 in the fourth row and the third column. A first end of PR43 is connected to a source electrode of T42, a gate electrode of T43 is connected to the pressure-sensing gating line in the fourth row SEL4, a drain electrode of T43 is connected to a second end of PR43, and the first end of PR43 is further connected to the pressure-sensing reading line in the third column DL3.

A piezoresistance sensing circuit in the fourth row and the fourth column includes a piezoresistance sensor PR44 in the fourth row and the fourth column and a switching transistor T44 in the fourth row and the fourth column. A first end of PR44 is connected to a source electrode of T43, a gate electrode of T44 is connected to the pressure-sensing gating line in the fourth row SEL4, a drain electrode of T44 is connected to a second end of PR44, the first end of PR44 is further connected to the pressure-sensing reading line in the fourth column DL4, and a source electrode T44 is connected to the ground GND.

The pressure-sensing sub-circuit is connected each of to the pressure-sensing reading line in the first column DL1, the pressure-sensing reading line in the second column DL2, the pressure-sensing reading line in the third column DL3 and the pressure-sensing reading line in the fourth column DL4, and configured to perform the pressure-sensing operation in accordance with voltage signals acquired respectively from the pressure-sensing reading line in the first column DL1, the pressure-sensing reading line in the second column DL2, the pressure-sensing reading line in the third column DL3 and the pressure-sensing reading line in the fourth column DL4.

During the operation of the pressure-sensing circuit in FIG. 1, SEL1, SEL2, SEL3 and SEL4 output a high level in a time-division manner, and T1, T2, T3 and T4 are turned on in a time-division manner.

In the case that SEL1 outputs a high level, T1, T11, T12, T13 and T14 are turned on, the current $I_B$ flows sequentially through the turned-on T1, PR11, the turned-on T11, PR12, the turned-on T12, PR13, the turned-on T13, PR14, the turned-on T14 connected in series with each other, and then to the ground GND. On-state resistances of T1, T11, T12, T13 and T14 are r1, r11, r12, r13 and r14 respectively. In the case that PR13 has not been pressed yet, the resistance of PR13 is r3, and in the case that PR14 has not been pressed yet, the resistance of PR14 is r4. In the case that PR13 has been pressed, the resistance of PR13 is r3+$\Delta$r3, and in the case that PR14 has been pressed, the resistance of PR14 is r4+$\Delta$r4. In the case that both PR13 and PR14 have not been pressed yet, a voltage Vd14 from DL4 is equal to $I_B\times$(r14+r4), and a voltage Vd13 from DL3 is equal to Vd14+$I_B\times$(r13+r3). In the case that both PR13 and PR14 have been pressed, a voltage Vd14' from DL4 is equal to $I_B\times$(r14+r4+$\Delta$r4), and a voltage Vd13' from DL3 is equal to Vd14'+$I_B\times$(r13+r3+$\Delta$r3). Hence, a change $\Delta$r3 in the resistance of PR14 in the case that PR14 has been pressed may be calculated through Vd13'−Vd13=$I_B\times$($\Delta$r3+$\Delta$r4) (where $\Delta$r4 is equal to Vd14'−Vd14), so as to determine the pressure-sensing change.

In actual use, the current input control transistors, the switching transistors, the piezoresistance sensors, the pressure-sensing gating lines and the pressure-sensing reading lines in FIG. 1 are all arranged on a display panel, and the first current source 10 is arranged on a driving IC.

For the pressure-sensing circuit in FIG. 1, whether or not the corresponding piezoresistance sensor has been pressed is determined in accordance with a difference between the voltages from two adjacent pressure-sensing reading lines, so as to perform the pressure-sensing operation. As a result, it is able to prevent the pressure-sensing result from being adversely affected by the on-state resistance of the switching transistor of the switching circuit, and reduce adverse impact of the resistance of the wire.

Figure 2:
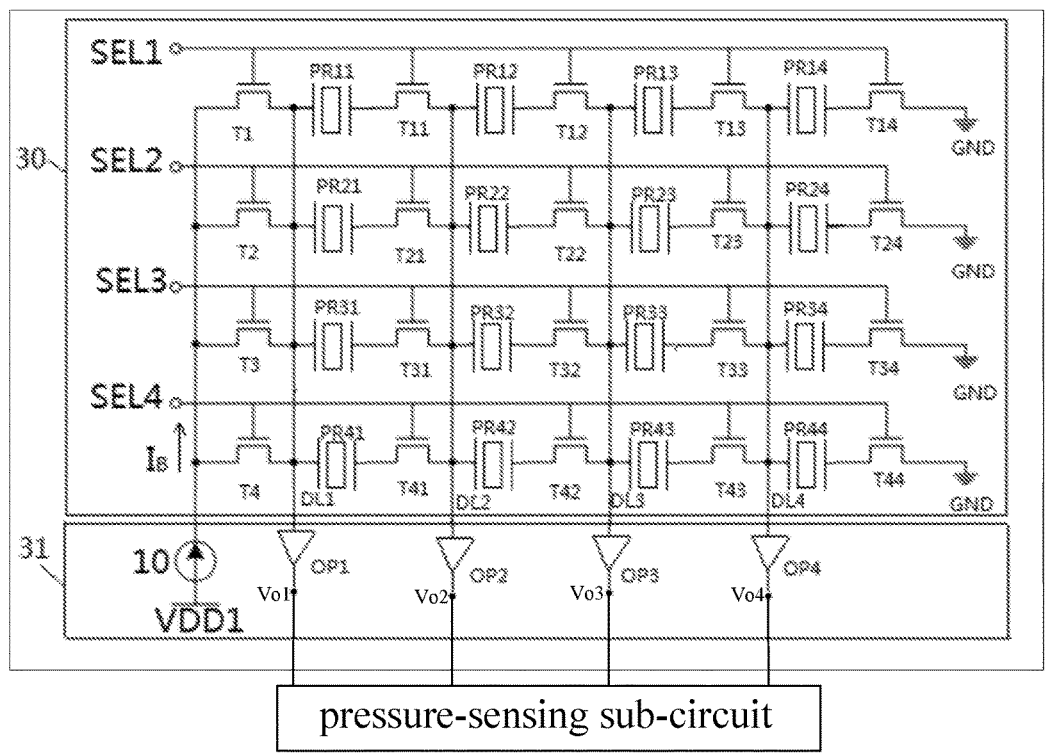
FIG. 2 is another schematic view showing the pressure-sensing circuit according to one embodiment of the present disclosure.

As shown in FIG. 2, on the basis of the pressure-sensing circuit in FIG. 1, the pressure-sensing circuit further includes a first voltage amplifier OP1, a second voltage amplifier OP2, a third voltage amplifier OP3 and a fourth voltage amplifier OP4.

An input end of OP1 is connected to the pressure-sensing reading line in the first column DL1, and an output end of OP1 outputs a first output voltage Vo1. OP1 is configured to amplify the voltage signal acquired from DL1 so as to acquire Vo1.

An input end of OP2 is connected to the pressure-sensing reading line in the second column DL2, and an output end of OP2 outputs a second output voltage Vo2. OP2 is configured to amplify the voltage signal acquired from DL2 so as to acquire Vo2.

An input end of OP3 is connected to the pressure-sensing reading line in the third column DL3, and an output end of OP3 outputs a third output voltage Vo3. OP3 is configured to amplify the voltage signal acquired from DL3 so as to acquire Vo3.

An input end of OP4 is connected to the pressure-sensing reading line in the fourth column DL4, and an output end of OP4 outputs a fourth output voltage Vo4. OP4 is configured to amplify the voltage signal acquired from DL4 so as to acquire Vo4.

The pressure-sensing sub-circuit is connected to each of the output ends of OP1, OP2, OP3 and OP4, and configured to perform the pressure-sensing operation in accordance with Vo1, Vo2, Vo3 and Vo4.

In actual use, the current input control transistors, the switching transistors, the piezoresistance sensors, the pressure-sensing gating lines and the pressure-sensing reading lines are arranged on the display panel 30, and the first current source 10, the first voltage amplifier OP1, the second voltage amplifier OP2, the third voltage amplifier OP3 and the fourth voltage amplifier OP4 are arranged on the driving IC 31.

The present disclosure further provides in some embodiments a method for driving the above-mentioned pressure-sensing circuit, which includes steps of: providing, by a current supply circuit, a pressure-sensing current; applying a current to pressure-sensing gating lines in N rows in a time-division manner; in the case that the current has been applied to a pressure-sensing gating line in the $n^{th}$ row, controlling, by a switching circuit in an $n^{th}$ row and an $m^{th}$ column, a second end of a piezoresistance sensor in the $n^{th}$ row and the $m^{th}$ column to be electrically connected to a pressure-sensing reading line in the $(m+1)^{th}$ column, and controlling, by a switching circuit in the $n^{th}$ row and an $M^{th}$ column, a second end of a piezoresistance sensor in the $n^{th}$ row and the $M^{th}$ column to be electrically connected to a first level end so as to enable the piezoresistance sensors in the $n^{th}$ row to be connected in series with each other, and controlling, by an $n^{th}$ input control circuit, the current supply circuit to be electrically connected to a first end of a piezoresistance sensor in the $n^{th}$ row and a first column so as to enable the pressure-sensing current from the current supply circuit to flow to the first end of the piezoresistance sensor in the $n^{th}$ row and the first column, thereby to enable the pressure-sensing current to flow to the first level end through the piezoresistance sensors in the $n^{th}$ row connected in series with each other, where each of N and M is an integer greater than 1, n is a positive integer smaller than or equal to N, and m+1 is a positive integer smaller than or equal to M; and acquiring, by a pressure-sensing sub-circuit, a voltage signal from each pressure-sensing reading line, and performing a pressure-sensing operation in accordance with the voltage signal.

According to the method in the embodiments of the present disclosure, through the cooperation of a piezoresistance array and a detection circuit, it is able to perform the pressure-sensing operation in accordance with the voltage signal acquired from the pressure-sensing reading line. The pressure-sensing sub-circuit may acquire a voltage value of the voltage signal generated by a piezoresistance sensor in the $n^{th}$ row and an $(m-1)^{th}$ column in accordance with a difference between a voltage value of a voltage signal acquired from the pressure-sensing reading line in the $n^{th}$ row and the $m^{th}$ column and a voltage value of a voltage signal acquired from the pressure-sensing reading line in the $n^{th}$ row and the $(m-1)^{th}$ column, so as to determine a resistance of the piezoresistance sensor in the $n^{th}$ row and the $(m-1)^{th}$ column, thereby to determine whether or not a pressure has been applied to the piezoresistance sensor in the $n^{th}$ row and the $(m-1)^{th}$ column in accordance with the resistance. The pressure-sensing operation is performed in accordance with the voltage difference, so it is able to prevent a pressure-sensing result from being adversely affected by an on-state resistance of the switching transistor of the switching circuit, and reduce adverse impact of resistance of a wire, and prevent the voltage value of the voltage signal generated by the piezoresistance sensors and acquired at a proximal or remote end (near to or far away from the pressure-sensing sub-circuit) from being adversely affected by the resistance of the wire to some extent, thereby to improve the pressure-sensing accuracy.

To be specific, the pressure-sensing circuit includes a voltage amplification circuit, the pressure-sensing sub-circuit is connected to each of the pressure-sensing reading lines via the voltage amplification circuit. The voltage amplification circuit includes a plurality of voltage amplifiers. An input end of each of the voltage amplifiers is connected to one of the pressure-sensing reading lines, and an output end of the voltage amplifier is connected to the pressure-sensing sub-circuit. The step of acquiring, by the pressure-sensing sub-circuit, the voltage signal from each pressure-sensing reading line and performing the pressure-sensing operation in accordance with the voltage signal includes: acquiring, by each voltage amplifier, the voltage signal from the pressure-sensing reading line connected to the voltage amplifier, amplifying, by the voltage amplifier, the voltage signal, and transmitting, by the voltage amplifier, the amplified voltage signal to the pressure-sensing sub-circuit; and performing, by the pressure-sensing sub-circuit, the pressure-sensing operation in accordance with the amplified voltage signal.

The present disclosure further provides in some embodiments a display device including at least one of the above-mentioned pressure-sensing circuits.

To be specific, the display device may further include a display panel and a driving IC. Pressure-sensing gating lines, pressure-sensing reading lines, piezoresistance sensing circuits arranged in N rows and M columns and a current input control circuit of the pressure-sensing circuit are arranged on the display panel, where each of N and M is an integer greater than 1. A pressure-sensing sub-circuit and a current supply circuit for supplying a pressure-sensing current of the pressure-sensing circuit are arranged on the driving IC.

To be specific, in the case that the pressure-sensing circuit includes a voltage amplification circuit, the voltage amplification circuit may be arranged on the driving IC.

A voltage generated in the case that a current flowing through a resistor may change along with a size of the current and a resistance value of the resistor, so the display device may be provided with at least two pressure-sensing circuits, so as to prevent the occurrence of an oversized voltage from a certain pressure-sensing reading line.

Figure 3:
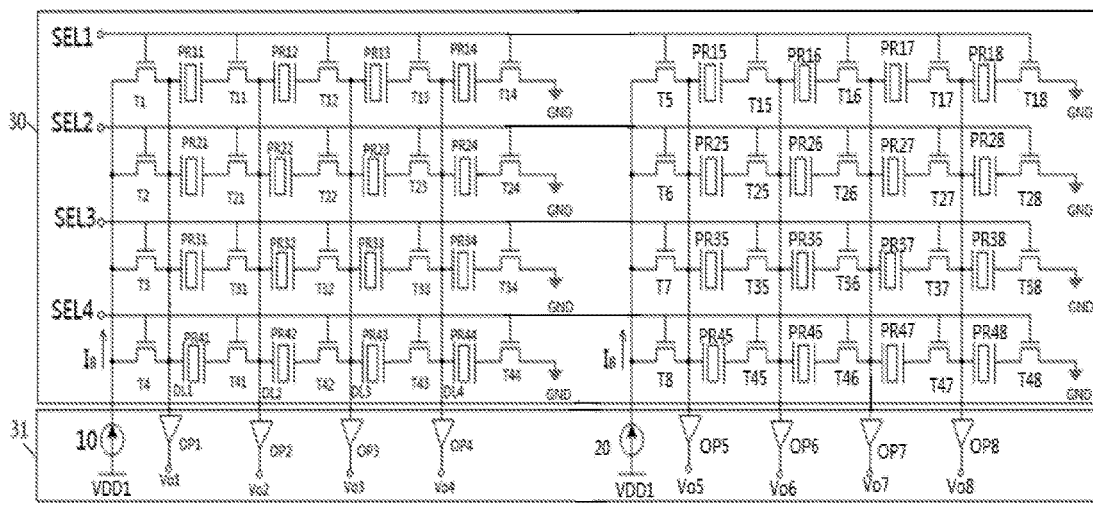
FIG. 3 is a circuit diagram of a display device including two pressure-sensing circuits according to one embodiment of the present disclosure.

As shown in FIG. 3, the display device includes two pressure-sensing circuits as shown in FIG. 2, i.e., a first pressure-sensing circuit and a second pressure-sensing circuit. Four pressure-sensing gating lines are share by the first pressure-sensing circuit and the second pressure-sensing circuit.

In FIG. 3, the reference sign VDD1 represents a high level signal input end, the reference sign SEL1 represents a pressure-sensing gating line in the first row, the reference sign SEL2 represents a pressure-sensing gating line in the second row, the reference sign SEL3 represents a pressure-sensing gating line in the third row, the reference sign SEL4 represents a pressure-sensing gating line in the fourth row, the reference sign DL1 represents a pressure-sensing reading line in the first column, the reference sign DL2 represents a pressure-sensing reading line in the second column, the reference sign DL3 represents a pressure-sensing reading line in the third column, the reference sign DL4 represents a pressure-sensing reading line in the fourth column, the reference sign DL5 represents a pressure-sensing reading line in the fifth column, the reference sign DL6 represents a pressure-sensing reading line in the sixth column, the reference sign DL7 represents a pressure-sensing reading line in the seventh column, the reference sign DL8 represents an pressure-sensing reading line in the eighth column, the reference sign OP1 represents a first voltage amplifier, the reference sign OP2 represents a second voltage amplifier, the reference sign OP3 represents a third voltage amplifier, the reference sign OP4 represents a fourth voltage amplifier, the reference sign OP5 represents a fifth voltage amplifier, the reference sign OP6 represents a sixth voltage amplifier, the reference sign OP7 represents a seventh voltage amplifier, and the reference sign OP8 represents an eighth voltage amplifier.

In FIG. 3, the reference sign T5 represents a fifth current input control transistor, the reference sign T6 represents a sixth current input control transistor, the reference sign T7 represents a seventh current input control transistor, the reference sign T8 represents an eighth current input control transistor, the reference sign PR15 represents a piezoresistance sensor in a first row and a fifth column, the reference sign T15 represents a switching transistor in the first row and the fifth column, the reference sign PR16 represents a piezoresistance sensor in the first row and a sixth column, the reference sign T16 represents a switching transistor in the first row and the sixth column, the reference sign PR17 represents a piezoresistance sensor in the first row and a seventh column, the reference sign T17 represents a switching transistor in the first row and the seventh column, the reference sign PR18 represents a piezoresistance sensor in the first row and an eighth column, the reference sign T18 represents a switching transistor in the first row and the eighth column, the reference sign PR25 represents a piezoresistance sensor in a second row and the fifth column, the reference sign T25 represents a switching transistor in the second row and the fifth column, the reference sign PR26 represents a piezoresistance sensor in the second row and the sixth column, the reference sign T26 represents a switching transistor in the second row and the sixth column, the reference sign PR27 represents a piezoresistance sensor in the second row and the seventh column, the reference sign T27 represents a switching transistor in the second row and the seventh column, the reference sign PR28 represents a piezoresistance sensor in the second row and the eighth column, the reference sign T28 represents a switching transistor in the second row and the eighth column, the reference sign PR35 represents a piezoresistance sensor in the third row and the fifth column, the reference sign T35 represents a switching transistor in the third row and the fifth column, the reference sign PR36 represents a piezoresistance sensor in the third row and the sixth column, the reference sign T36 represents a switching transistor in the third row and the sixth column, the reference sign PR37 represents a piezoresistance sensor in the third row and the seventh column, the reference sign T37 represents a switching transistor in the third row and the seventh column, the reference sign PR38 represents a piezoresistance sensor in the third row and the eighth column, the reference sign T38 represents a switching transistor in the third row and the eighth column, the reference sign PR45 represents a piezoresistance sensor in a fourth row and the fifth column, the reference sign T45 represents a switching transistor in the fourth row and the fifth column, the reference sign PR46 represents a piezoresistance sensor in the fourth row and the sixth column, the reference sign T46 represents a switching transistor in the fourth row and the sixth column, the reference sign PR47 represents a piezoresistance sensor in the fourth row and the seventh column, the reference sign T47 represents a switching transistor in the fourth row and the seventh column, the reference sign PR48 represents a piezoresistance sensor in the fourth row and the eighth column, the reference sign T48 represents a switching transistor in the fourth row and the eighth column, the reference sign 10 represents a first current source, and the reference sign 20 represents a second current source.

In actual use, the current input control transistors, the switching transistors, the piezoresistance sensors, the pressure-sensing gating lines and the pressure-sensing reading lines are arranged on the display panel 30, and the first current source 10, the second current source 20, the first voltage amplifier OP1, the second voltage amplifier OP2, the third voltage amplifier OP3, the fourth voltage amplifier OP4, the fifth voltage amplifier OP5, the sixth voltage amplifier OP6, the seventh voltage amplifier OP7 and the eighth voltage amplifier OP8 are arranged on the driving IC 31.

In actual use, in the case that the display device includes at least two pressure-sensing circuits, and each of the pressure-sensing circuits includes identical N pressure-sensing gating lines. In the case that the display device includes at least two pressure-sensing circuits, the N pressure-sensing gating lines may be shared by the pressure-sensing circuits.

To be specific, each pressure-sensing gating line may be a gate line, i.e., the gate line may further serve as the pressure-sensing gating line.

The display device may be any product or member having a display function, e.g., mobile phone, flat-panel computer, television, display, laptop computer, digital photo frame or navigator.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A pressure-sensing circuit, comprising pressure-sensing gating lines arranged in rows, pressure-sensing reading lines arranged in columns, piezoresistance sensing circuits arranged in N rows and M columns, a pressure-sensing sub-circuit, a current input control circuit, and a current supply circuit for supplying a pressure-sensing current, where each of N and M is an integer greater than 1;

a piezoresistance sensing circuit in an $n^{th}$ row and an $m^{th}$ column comprises a piezoresistance sensor in the $n^{th}$ row and the $m^{th}$ column and a switching circuit in the $n^{th}$ row and the $m^{th}$ column, where n is a positive integer smaller than or equal to N, and m+1 is a positive integer smaller than or equal to M;

a first end of the piezoresistance sensor in the $n^{th}$ row and the $m^{th}$ column is connected to the pressure-sensing reading line in the $m^{th}$ column, a control end of the switching circuit in the $n^{th}$ row and the $m^{th}$ column is connected to the pressure-sensing gating line in the $n^{th}$ row, a first end of the switching circuit in the $n^{th}$ row and the $m^{th}$ column is connected to a second end of the piezoresistance sensor in the $n^{th}$ row and the $m^{th}$ column, and a second end of the switching circuit in the $n^{th}$ row and the $m^{th}$ column is connected to a pressure-sensing reading line in a $(m+1)^{th}$ column;

the piezoresistance sensing circuit in the $n^{th}$ row and an $M^{th}$ column comprises a piezoresistance sensor in the $n^{th}$ row and the $M^{th}$ column and a switching circuit in the $n^{th}$ row and the $M^{th}$ column;

a first end of the piezoresistance sensor in the $n^{th}$ row and the $M^{th}$ column is connected to a pressure-sensing reading line in the $M^{th}$ column, a control end of the switching circuit in the $n^{th}$ row and the $M^{th}$ column is connected to the pressure-sensing gating line in the $n^{th}$ row, a first end of the switching circuit in the $n^{th}$ row and the $M^{th}$ column is connected to a second end of the piezoresistance sensor in the $n^{th}$ row and the $M^{th}$ column, and a second end of the switching circuit in the $n^{th}$ row and the $M^{th}$ column is connected to a first level end, wherein the first level end is the ground;

the current input control circuit comprises N current input control sub-circuits;

a first end of an $n^{th}$ current input control sub-circuit is connected to the current supply circuit, a first end of a piezoresistance sensor in the $n^{th}$ row and a first column is further connected to a second end of the $n^{th}$ current input control sub-circuit, and a control end of the $n^{th}$ current input control sub-circuit is connected to the pressure-sensing gating line in the $n^{th}$ row; and the pressure-sensing sub-circuit is connected to each of the pressure-sensing reading lines, and configured to perform a pressure-sensing operation in accordance with a voltage signal acquired from the pressure-sensing reading line.

2. The pressure-sensing circuit according to claim 1, wherein the switching circuit in the $n^{th}$ row and the $m^{th}$ column comprises a switching transistor in the $n^{th}$ row and the $m^{th}$ column, a gate terminal of the switching transistor in the $n^{th}$ row and the $m^{th}$ column is connected to the pressure-sensing gating line in the $n^{th}$ row, a first terminal of the switching transistor in the $n^{th}$ row and the $m^{th}$ column is connected to the second end of the piezoresistance sensor in the $n^{th}$ row and the $m^{th}$ column, and a second terminal of the switching transistor in the $n^{th}$ row and the $m^{th}$ column is connected to the pressure-sensing reading line in the $(m+1)^{th}$ column; and the switching circuit in the $n^{th}$ row and the $M^{th}$ column comprises a switching transistor in the $n^{th}$ row and the $M^{th}$ column, a gate terminal of the switching transistor in the $n^{th}$ row and the $M^{th}$ column is connected to the pressure-sensing gating line in the $n^{th}$ row, a first terminal of the switching transistor in the $n^{th}$ row and the $M^{th}$ column is connected to the second end of the piezoresistance sensor in the $n^{th}$ row and the $M^{th}$ column, and a second terminal of the switching transistor in the $n^{th}$ row and the $M^{th}$ column is connected to the first level end.

3. The pressure-sensing circuit according to claim 2, wherein the $n^{th}$ current input control sub-circuit comprises an $n^{th}$ current input control transistor, a gate terminal of the $n^{th}$ current input control transistor is connected to the pressure-sensing gating line in the $n^{th}$ row, a first terminal of the $n^{th}$ current input control transistor is connected to the current supply circuit, and a second terminal of the $n^{th}$ current input control transistor is connected to the first end of the piezoresistance sensor in the $n^{th}$ row and the first column.

4. The pressure-sensing circuit according to claim 3, wherein
the $n^{th}$ current input control transistor, the switching transistor in the $n^{th}$ row and the $m^{th}$ column, and the switching transistor in the $n^{th}$ row and the $M^{th}$ column are n-type transistors; or
the $n^{th}$ current input control transistor, the switching transistor in the $n^{th}$ row and the $m^{th}$ column, and the switching transistor in the $n^{th}$ row and the $M^{th}$ column are p-type transistors.

5. The pressure-sensing circuit according to claim 1, wherein the current supply circuit comprises a current source.

6. The pressure-sensing circuit according to claim 1, further comprising a voltage amplification circuit, wherein the pressure-sensing sub-circuit is connected to each of the pressure-sensing reading lines via the voltage amplification circuit;

the voltage amplification circuit comprises a plurality of voltage amplifiers;

an input end of each of the voltage amplifiers is connected to a respective one of the pressure-sensing reading lines, and an output end of the voltage amplifier is connected to the pressure-sensing sub-circuit; the voltage amplifier is configured to amplify the voltage signal acquired from the pressure-sensing reading line, and transmit the amplified voltage signal to the pressure-sensing sub-circuit; and the pressure-sensing sub-circuit is further configured to perform the pressure-sensing operation in accordance with the amplified voltage signal.

7. A method for driving the pressure-sensing circuit according to claim 1, comprising:

providing, by the current supply circuit, the pressure-sensing current;

applying a second current to the pressure-sensing gating lines in N rows in a time-division manner;

in the case that the second current is applied to the pressure-sensing gating line in the $n^{th}$ row, controlling, by the switching circuit in the $n^{th}$ row and the $m^{th}$ column, the second end of the piezoresistance sensor in the $n^{th}$ row and the $m^{th}$ column to be electrically connected to the pressure-sensing reading line in the $(m+1)^{th}$ column, and controlling, by the switching circuit in the $n^{th}$ row and an $M^{th}$ column, the second end of the piezoresistance sensor in the $n^{th}$ row and the $M^{th}$ column to be electrically connected to the first level end to enable the piezoresistance sensors in the $n^{th}$ row to be connected in series with each other, and controlling, by an $n^{th}$ input control circuit, the current supply circuit to be electrically connected to the first end of the piezoresistance sensor in the $n^{th}$ row and the first column to enable the pressure-sensing current supplied by the current supply circuit to flow to the first end of the piezoresistance sensor in the $n^{th}$ row and the first column, to enable the pressure-sensing current to flow to the first level end through the piezoresistance sensors in the $n^{th}$ row connected in series with each other, where each of the N and M is the integer greater than 1, n is the positive integer smaller than or equal to N, and m+1 is the positive integer smaller than or equal to M; and acquiring, by the pressure-sensing sub-circuit, the voltage signal from each of the pressure-sensing reading lines, and performing the pressure-sensing operation in accordance with the voltage signal.

8. The method according to claim 7, wherein the pressure-sensing circuit comprises a voltage amplification circuit, wherein the pressure-sensing sub-circuit is connected to each of the pressure-sensing reading lines via the voltage amplification circuit; the voltage amplification circuit comprises a plurality of voltage amplifiers; an input end of each of the voltage amplifiers is connected to a respective one of the pressure-sensing reading lines, and an output end of the voltage amplifier is connected to the pressure-sensing sub-circuit, wherein acquiring, by the pressure sensing sub-circuit, the voltage signal from each of the pressure sensing reading lines and performing the pressure sensing operation in accordance with the voltage signal comprises:

acquiring, by the voltage amplifier, the voltage signal from the pressure sensing reading line connected to the voltage amplifier, amplifying, by the voltage amplifier, the voltage signal, and transmitting, by the voltage amplifier, the amplified voltage signal to the pressure sensing sub-circuit; and performing, by the pressure sensing sub-circuit, the pressure sensing operation in accordance with the amplified voltage signal.

9. A display device, comprising one or more pressure-sensing circuits each according to claim 1.

10. The display device according to claim 9, further comprising a display panel and a driving Integrated Circuit (IC), wherein the pressure-sensing gating lines, the pressure-sensing reading lines, the piezoresistance sensing circuits arranged in N rows and M columns, and the current input control circuit of the pressure-sensing circuit are arranged on the display panel, where each of N and M is an integer greater than 1; and the pressure-sensing sub-circuit and the current supply circuit for supplying the pressure-sensing current of the pressure-sensing circuit are arranged on the driving IC.

11. The display device according to claim 10, wherein the pressure-sensing circuit comprises a voltage amplification circuit which is arranged on the driving IC.

12. The display device according to claim 9, wherein the display device comprises at least two pressure-sensing circuits, and each of the at least two pressure-sensing circuits comprises identical N pressure-sensing gating lines.

13. The display device according to claim 12, wherein each of the pressure-sensing gating lines is a gate line.

14. The display device according to claim 9, wherein the switching circuit in the $n^{th}$ row and the $m^{th}$ column comprises a switching transistor in the $n^{th}$ row and the $m^{th}$ column, a gate terminal of the switching transistor in the $n^{th}$ row and the $m^{th}$ column is connected to the pressure-sensing gating line in the $n^{th}$ row, a first terminal of the switching transistor in the $n^{th}$ row and the $m^{th}$ column is connected to the second end of the piezoresistance sensor in the $n^{th}$ row and the $m^{th}$ column, and a second terminal of the switching transistor in the $n^{th}$ row and the $m^{th}$ column is connected to the pressure-sensing reading line in the $(m+1)^{th}$ column; and the switching circuit in the $n^{th}$ row and the $M^{th}$ column comprises a switching transistor in the $n^{th}$ row and the $M^{th}$ column, a gate terminal of the switching transistor in the $n^{th}$ row and the $M^{th}$ column is connected to the pressure-sensing gating line in the $n^{th}$ row, a first terminal of the switching transistor in the $n^{th}$ row and the $M^{th}$ column is connected to the second end of the piezoresistance sensor in the $n^{th}$ row and the $M^{th}$ column, and a second terminal of the switching transistor in the $n^{th}$ row and the $M^{th}$ column is connected to the first level end.

15. The display device according to claim 14, wherein the $n^{th}$ current input control sub-circuit comprises an $n^{th}$ current input control transistor, a gate terminal of the $n^{th}$ current input control transistor is connected to the pressure-sensing gating line in the $n^{th}$ row, a first terminal of the $n^{th}$ current input control transistor is connected to the current supply circuit, and a second terminal of the $n^{th}$ current input control transistor is connected to the first end of the piezoresistance sensor in the $n^{th}$ row and the first column.

16. The display device according to claim 15, wherein
the $n^{th}$ current input control transistor, the switching transistor in the $n^{th}$ row and the $m^{th}$ column, and the switching transistor in the $n^{th}$ row and the $M^{th}$ column are n-type transistors; or the $n^{th}$ current input control transistor, the switching transistor in the $n^{th}$ row and the $m^{th}$ column, and the switching transistor in the $n^{th}$ row and the $M^{th}$ column are p-type transistors.

17. The display device according to claim 9, wherein the current supply circuit comprises a current source.

18. The display device according to claim 9, wherein the pressure-sensing circuit further comprises a voltage amplification circuit, wherein the pressure-sensing sub-circuit is connected to each of the pressure-sensing reading lines via the voltage amplification circuit;

the voltage amplification circuit comprises a plurality of voltage amplifiers;

an input end of each of the voltage amplifiers is connected to a respective one of the pressure-sensing reading lines, and an output end of the voltage amplifier is connected to the pressure-sensing sub-circuit; the voltage amplifier is configured to amplify the voltage signal acquired from the pressure-sensing reading line, and transmit the amplified voltage signal to the pressure-sensing sub-circuit; and the pressure-sensing sub-circuit is further configured to perform the pressure-sensing operation in accordance with the amplified voltage signal.

* * * * *